(12) United States Patent
Nakamura et al.

(10) Patent No.: US 6,261,389 B1
(45) Date of Patent: Jul. 17, 2001

(54) SYNCHRONIZER RING

(75) Inventors: Yoshikatsu Nakamura; Tetsuo Masuyama; Takao Omiya; Hiroshi Takiguchi, all of Tochigi-ken (JP)

(73) Assignee: Nippon Piston Ring Co., Ltd., Tokyo-to (JP)

( * ) Notice: Subject to any disclaimer, the term of this patent is extended or adjusted under 35 U.S.C. 154(b) by 0 days.

(21) Appl. No.: 09/069,968

(22) Filed: Apr. 30, 1998

(30) Foreign Application Priority Data

Apr. 30, 1997 (JP) .................................................. 9-112476

(51) Int. Cl.$^7$ .................................................. C22C 38/16
(52) U.S. Cl. .................. 148/332; 192/107 M; 420/89; 420/99
(58) Field of Search ................. 75/232, 246, 243; 192/107 M; 148/332; 420/89, 99, 93

(56) References Cited

U.S. PATENT DOCUMENTS

| | | |
|---|---|---|
| 4,943,321 | 7/1990 | Akutsu . |
| 5,049,183 | 9/1991 | Saka et al. . |
| 5,249,661 * | 10/1993 | Kawamura et al. ............ 192/107 M |
| 5,337,872 * | 8/1994 | Kawamura et al. ............ 192/107 M |
| 5,370,725 * | 12/1994 | Kawamura et al. .................... 75/243 |
| 5,407,043 * | 4/1995 | Yamada ............................ 192/107 M |
| 5,628,046 | 5/1997 | Dautzenberg et al. . |
| 5,861,565 * | 1/1999 | Omiya et al. ........................... 75/243 |
| 5,900,559 * | 5/1999 | Nakamura et al. ..................... 75/246 |

FOREIGN PATENT DOCUMENTS

| | | |
|---|---|---|
| 3808460 | 9/1988 | (DE) . |
| 4031408 C2 | 4/1991 | (DE) . |
| 4331938 | 3/1995 | (DE) . |
| 7-6043 | 1/1995 | (JP) . |
| 7-18450 | 3/1995 | (JP) . |

* cited by examiner

Primary Examiner—Scott Kastler
(74) Attorney, Agent, or Firm—Crowell & Moring, L.L.P.

(57) ABSTRACT

The present invention provides a synchronizer ring excellent in strength and abrasion resisting property, used in a speed change gear. This synchronizer ring according to the invention is consisted of, by weight, C:0.2~1.0%, Ni:1.0~6.0%, Mo:0.6~3.0%, Cu:1.0~4.0% and the reminder Fe and inevitable impurities, and is made of Fe sintered alloy of which base composition comprises of mainly martonsite and bainite. And the base composition is preferably consisted of, by volume, martensite: 57~80%, bainite: 17~40%, austenite: 8% or less.

3 Claims, 1 Drawing Sheet

SYNCHRONIZER RING

FIELD OF THE INVENTION

The present invention relates to a synchronizer ring used in the synchronizer of a speed change gear, especially to a synchronizer ring made of Fe sintered alloy superior in strength and abrasion resisting property.

DESCRIPTION OF THE PRIOR ART

In speed change gears for changing a speed in gearing, a synchronizer has been employed to synchronize the circumferential speeds of mating gears when the gears are engaged, because unless one of the mating gears synchronizes with the other one in their circumferential speed, noises will occur in a speed change and occasionally the gears could be damaged.

An example of such a synchronizer is shown in FIG. 2, in which the center line of rotation is indicated by one-point dotted line.

At first, when a shift lever (not shown) is moved, a rotating sleeve 2 moves in a direction shown by arrow S, whereby a synchronizer key 3 abuts against a synchronizer ring 4 to push the ring. Then the inner tapered peripheral surface 40 of the synchronizer ring 4 is forcedly engaged against a cone portion 50 of a clutch gear 5 as its mating member, which generates frictional force to rotate the clutch gear 5. Further movement of the sleeve 2 in the arrow direction (S) causes &ore frictional force thereby to Rake the rotation of the sleeve 2 essentially equal to that of the clutch gear 5 in their circumferential speeds. In a condition that the synchronization has been completed and therefore there is no relative speed difference between the sleeve 2 and the clutch gear 5, when the sleeve 2 is forced to move in the arrow direction (S), spline 21 of the sleeve 2 engages a spline chaffer 51 of the clutch gear 5 thereby to complete the speed change.

As shown in FIG. 1, the synchronizer ring 4 is provided, at the outer peripheral surface thereof, with a synchronizer chamfer 41 to engage with the spline 21 of the sleeve 2, and is fomed, at the inner tapered peripheral surface thereof, with top lands 42 of mutual concave-convex shape which will effect frictional force to attain the synchronization. Normally, in order to bear up against the friction at contact, the synchronizer ring 4 is made of brass series metal or bronze series metal.

On the other hand, in recent smaller light weight synchronizers, to attain the synchronization, contact face-pressure increases which occurs between the gear cone portion and the top lands formed on the inner tapered peripheral surface of the synchronizer ring, which results in severe wears at the respective members.

To solve these problems, for the purpose of hardening the top lands which may be easily worn out, some measures have been tried, such as sprayed layer of Mo. Al—Si and so forth or resin coating applied on the inner tapered peripheral surface of the synchronizer ring. Also, in order to heighten the strength, some measures such as sinter forging or the like have been tried, whereas these measures each are accompanied with drawbacks of high costs.

SUMMARY OF THE INVENTION

An object of the invention is to solve advantageously the above mentioned problems and therefore to provide a synchronizer ring superior in abrasion resisting property with a high strength.

To attain the object, according to the present invention, a synchronizer ring is provided which is used in the synchronizer of a speed change gear, characterized in that said synchronizer ring is consisted of, by weight, C:0.2~1.0%, Ni:1.0~6.0%, Mo:0.6~3.0%, Cu:1.0~4. 0% and the reminder Fe and inevitable impurities, and is wade of Fe sintered alloy of which base composition comprises of mainly martensite and bainite.

Also, according to the invention, a synchronizer ring is provided which is used in the synchronizer of a speed change gear, characterized in that said synchronizer ring is consisted of, by weight, C:0.2~1.0%, Ni:1.0~6.0%, Mo:0.6~3.0%, Cu:1.0~4.0% and the reminder Fe and inevitable impurities, and is applied one forming treatment and one sintering treatment, and further is made of Fe sintered alloy of which base composition comprises of mainly martensito and bainite.

Furthermore, according to the invention, said base composition is preferably comprised of, by volume, martensite: 57~80%, bainite:17~40% and austenite:8% or less.

DESCRIPTION OF THE PREFERRED EMBODIMENTS

Figure 1:
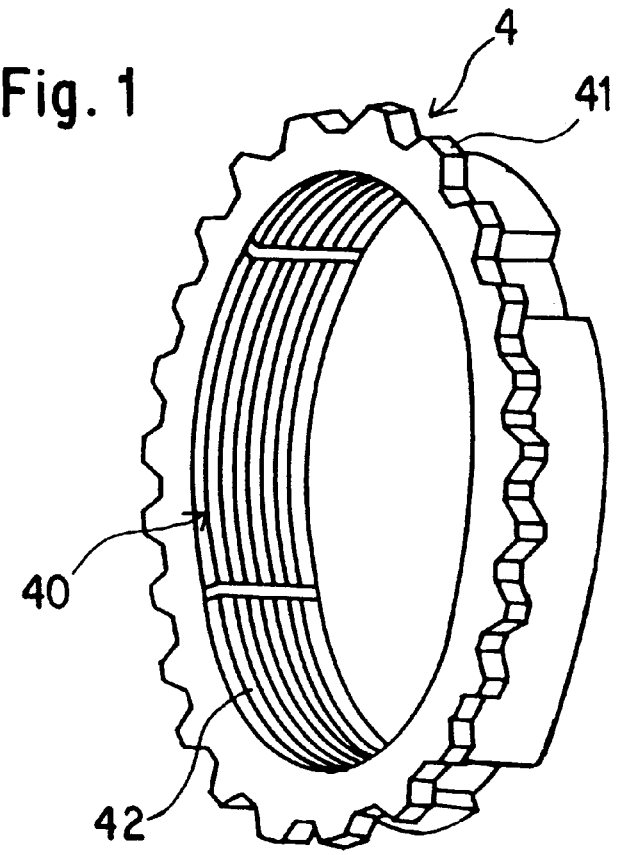
FIG. 1 is a perspective view of an example of a synchronizer ring.
Figure 2:
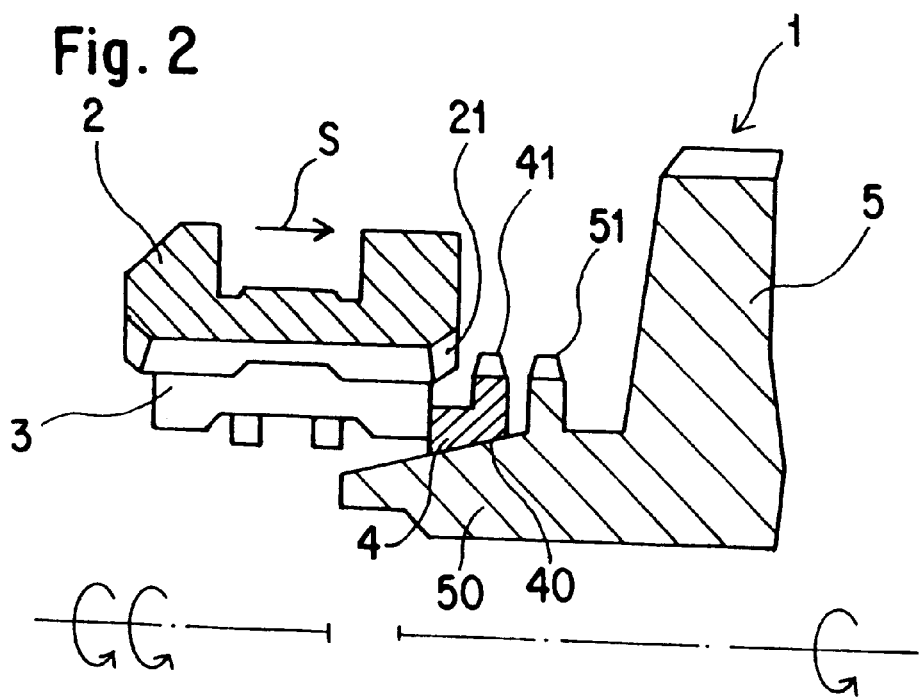
FIG. 2 is a partial cross sectional view of a synchronizer.

We will now explain the reasons for limitations of the sintering alloy compositions of an inventive synchronizer ring.

C: 2.0~1.0

Carbon is a necessary element to obtain a determined comosition and also serves to heighten the strength as well as abrasion resisting property. On the other hand, it exceeds 1.0%, both strength and abrasion resisting property are lowered. Also, if it is less than 0.2%, a desirable strength and expected abrasion resisting property can not be obtained. Therefore, C is limited within the range of 0.2~1.0%.

Ni: 1.0~6.0%

Nickel improves hardenability and functions to transform the composition to martensite and bainite, and heighten the strength. If it is less than 1.0%, these effects can not be found, while if it exceeds 6.0%, its abrasion resisting property decreases. Therefore, Ni is limited within the range of 1.0%~6.0%.

Mo: 0.6~3.0%.

Molybdenum solves into the base composition or precipitates as carbide, and improves the strength and abrasion resisting property of the base composition. Furthermore, it serves to improve hardenability at sintering. Otherwise, if it is less than 0.6%, these effects can not be found, while it exceeds 3.0%, an effect consistent with its additive quantity can not be obtainable. Therefore, Mo is limited within the range of 0.6~3.0%.

Cu: 1.0~4.0%

Copper solves into the base composition or precipitates therein and functions to heighten the strength of the base composition. Otherwise, if it is less than 1.0%, these effects can not be found, while if it exceeds 4.0%, it causes expansion at sintering and the base composition becomes considerably brittle. Therefore, Cu is limited within the range of 1.0~4.0%.

The reminder comprises of Fe and inevitable impurities. As for the inevitable impurities, 0.03% or less of S and 0.03% or less of Mn are permissible. Also, in a synchronizer ring according the invention, the base comosition of its sintered alloy is consisted of mainly martensite and bainite. If ferrite or pearlite composition precipitates in the base composition, its strength and abrasion resisting property deteriorates. Therefore, the composition consisted of mainly martensite and bainite is adopted which prevents precipitation of ferrite and pearlite composition. Incidentally, presence of slight quantity of austenite is permissible.

The inclusive ratio of the martensite composition in the base metal is preferably 57~80% (by volume). If the composition ratio is below 57%, bainite increases and the hardness lovers. Also, austenite increases, the thermal conductivity lovers and the scuffing wear will be easily caused. Otherwise, If the composition ratio exceeds 80%, the strength goes down. Therefore, the martensite composition will be in the range of 57~80% (by volume).

The inclusive ratio of bainite in the base metal is preferably 17~40% (by volume). If the composition ratio is below 17%, the strength is insufficient, while if it exceeds 40%, the thermal conductivity lowers and the scuffing wear will be easily caused. Accordingly, the bainite composition will be in the range of 17~40% (by volume).

Austenite may be included by 8% or less in addition to martensite and bainite as the base composition. If the quantity of austenite in the base composition exceeds 8%, the thermal conductivity lowers and the scuffing wear will be easily caused. Therefore, it will be preferably 8% or less.

In order to obtain a sintered alloy of the invention, atomized alloy steel powder of which alloy elements' inclusion other than C is of the above described composition will be mixed with graphite powder and lubricant, then formed under pressure in a sold having determined dimensions to green formation, and finally sintered. The grain size of the used powder is preferably below 200 μm.

Also, iron alloy powder in which Mo of the above described composition is pre-alloyed will be mixed with Ni powder and Cu powder so as to form the above mentioned composition, then diffusion-annealed so that Ni and Cu are partially alloyed, and after that, further mixed with graphite powder and lubricant, formed under pressure to a green formation, and finally sintered. Otherwise, iron powder will be mixed with Mo powder, Ni powder, Cu powder, graphite powder and also lubricant, then formed under pressure to a green formation, and sintered. Incidentally, the mixed graphite powder is combined as being the above mentioned C composition in the sintered alloy.

The sintering is preferably done in a vacuum atmosphere at 1100~1300° C. If the sinter temperature exceeds 1300° C., over-shrinkage occurs and dimensional accuracy lovers, while if the temperature is below 1100° C., the strength goes down.

After sintering, the sintered body is preferably cooled at a cooling rate of 2.5~0.25° C./s. If the cooling rate exceeds 2.5° C./s, distortion will be easily caused whereby the flatness and circularity will deteriorate. Otherwise, if the cooling rate is below 0.25° C./s, quantity of bainite increases, the hardness lovers and the abrasion resisting property deteriorates. Also, at a cooling rate below 0.25° C./s, precipitation of ferrite is seen and the strength lowers.

According to the invention, the forming under pressure is done once, and the sintering is done also once. If the forming is done twice or more, cost for the sinter forging becomes high. Accordingly, one forming under pressure is done.

On the condition of one forming under pressure and one sintering, pore rate of the sintered alloy is 7~13% by volume. After sintering, the sintered body is worked to a product by machining or other means.

Further, in order to improve the abrasion resisting property, a steam treatment as a surface treatment is preferably applied. By means of a steam treatment in which heating is done in a steam atmosphere, its surface is formed with oxide coating whereby the abrasion resisting property improves and also surface roughness changes to thereby maintain or heighten coefficient of friction.

We will now explain some examples. Fe—Mo powder, Ni powder and Cu powder were combined as being the composition represented in Table 1, thereby to diffusion-attach Ni powder and Cu powder on surfaces of Fe—Mo powder, which resulted in steel powder. This steel powder 100 by weight rate was combined with graphite powder 0.4~0.6 by weight rate and stearic acid zinc 1 by weight rate and mixed therewith, and thereafter, formed under pressure to green bodies with determined dimensions. These green bodies were sintered in a vacuum atmosphere at 1140° C. to sintered bodies which in turn were worked to products with determined dimensions (inner diameter 71 mm φ×thickness 9 mm) as synchronizer rings.

Relative to the resulted synchronizer rings, ratios of the respective compositions by microscopic inspection, hardness and tensile strength were measured, and abrasion tests were performed.

The results are represented in Table 2.

| Number of sintered body No. | Green density g/cm³ | Number of formation | Sintering temperature °C. | Cooling rate °C./s | Chemical composition of sintered bodies (wt %) | | | | Composition of sintered bodies (volume %) | | | | Remarks |
|---|---|---|---|---|---|---|---|---|---|---|---|---|---|
| | | | | | C | Ni | Mo | Cu | martensite | bainite | ferrite | austenite | |
| 1 | 7.0 | 1 | 1140 | 0.85 | 0.50 | 4.0 | 1.5 | 2.0 | 65 | 32 | | 3 | Sample of the invention |
| 2 | 7.0 | 1 | 1140 | 0.85 | 0.50 | 4.0 | 0.50 | 1.50 | 42 | 50(P + B) | 4 | 4 | Sample of prior art |

P: pearite
B: bainite

TABLE 2

| Number of sintered bodies No. | Hardness Hv | Tensile strength MPa | Remarks |
|---|---|---|---|
| 1 | 280 | 930 | Sample of the invention |
| 2 | 220 | 720 | Sample of prior art |

As represented in Table 2, samples of the invention have higher hardness and higher strength than those of prior art ones. Also, compared with samples of the prior art, samples of the invention are of less wear and more excellent in abrasion resisting property.

A synchronizer ring according to the present invention has high strength and excellent abrasion resisting property, can be consistent with the smaller sized light weight promotion and therefore provides considerable effects to the industory.

Having now fully described the present invention, it will be understood for one of ordinary skill in the art that many changes and modifications can be made without departing from the spirit or scope of the invention as set forth herein.

The entire disclosure of Japanese Patent Application No.112476/1997 filed Apr. 30, 1997 including specification, claims, drawings and summary are incorporated herein by reference in its entirety.

LIST OF REFERENCE NUMERALS AND PARTS

| LIST OF REFERENCE NUMERALS AND PARTS |
|---|
| 1 synchronizer |
| 2 sleeve |
| 3 synchronizer key |
| 4 synchronizer ring |
| 5 clutch gear |
| 21 spline |
| 40 inner tapered peripheral surface |
| 41 synchronizer chamfer |
| 50 cone portion |
| 51 spline chamfer |

What is claimed is:
1. A synchronizer ring made of Fe sintered alloy comprising, by weight,
C:0.2~1.0%,
Ni:1.0~6.0%,
Mo:0.6~3.0%,
Cu:1.0~4.0%,
and the remainder Fe and inevitable impurities, wherein the base composition of the Fe sintered alloy comprises, by volume, martensite: 57~80%, bainite: 17~40% and austenite: 8% or less.

2. A process for making a synchronizer ring according to claim 1, comprising:
mixing atomized steel powder with graphite powder and lubricant, wherein the steel powder comprises Ni:1.0~6.0%, Mo:0.6~3.0%, and Cu:1.0~4.0%;
forming an Fe alloy under pressure; and
sintering the Fe alloy.

3. The synchronizer ring made of Fe sintered alloy according to the method of claim 2, wherein the base composition comprises, by volume, martensite: 57~80%, bainite: 17~40% and austenite: 8% or less.

* * * * *